(12) United States Patent
Horie et al.

(10) Patent No.: US 12,217,074 B2
(45) Date of Patent: Feb. 4, 2025

(54) SELECTIVE INJECTION OF GC SAFEPOINTS FOR JNI INVOCATIONS

(71) Applicant: INTERNATIONAL BUSINESS MACHINES CORPORATION, Armonk, NY (US)

(72) Inventors: Michihiro Horie, Ageo (JP); Kazunori Ogata, Soka (JP); Hiroshi Horii, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 377 days.

(21) Appl. No.: 17/082,250

(22) Filed: Oct. 28, 2020

(65) Prior Publication Data
US 2022/0129290 A1    Apr. 28, 2022

(51) Int. Cl.
*G06F 9/455*    (2018.01)
*G06F 8/41*    (2018.01)
(Continued)

(52) U.S. Cl.
CPC ........ *G06F 9/45558* (2013.01); *G06F 8/4434* (2013.01); *G06F 9/45504* (2013.01);
(Continued)

(58) Field of Classification Search
CPC ............. G06F 9/45558; G06F 9/45504; G06F 9/5077; G06F 8/4434; G06F 12/0253;
(Continued)

(56) References Cited

U.S. PATENT DOCUMENTS 7,831,961 B1    11/2010    Bush et al.
9,152,456 B2    10/2015    Titzer et al.
(Continued)

OTHER PUBLICATIONS

"Psychosomatic, Lobotomy, Saw: Safepoints: Meaning, Side Effects and Overheads," http://psy-lob-saw.blogspot.com/2015/12/safepoints.html, Dec. 14, 2015, pp. 1-12.
(Continued)

*Primary Examiner* — Chat C Do
*Assistant Examiner* — Bradford F Wheaton
(74) *Attorney, Agent, or Firm* — Tutunjian & Bitetto, P.C.; Robert Richard Aragona (57) ABSTRACT

A computer-implemented method is provided for managing Garbage Collection (GC) safepoints. The method includes determining whether a GC safepoint for a target native method can be removed by checking a heap occupancy ratio prior to executing the target native method. The method further includes removing the GC safepoint responsive to the heap occupancy ratio prior to executing the target native method being less than a threshold occupancy amount percentage. The method also includes determining whether the GC safepoint for the target native method can be removed by checking a most recent GC pause time. The method additionally includes removing the GC safepoint responsive to the most recent GC pause time being shorter by a threshold pause time amount percentage than an execution time of the target native method.

20 Claims, 7 Drawing Sheets

(51) Int. Cl.
*G06F 9/50* (2006.01)
*G06F 12/02* (2006.01)

(52) U.S. Cl.
CPC ........ *G06F 9/5077* (2013.01); *G06F 12/0253* (2013.01); *G06F 12/0269* (2013.01); *G06F 2009/45575* (2013.01); *G06F 2009/45583* (2013.01); *G06F 2009/45591* (2013.01); *G06F 2209/5022* (2013.01)

(58) Field of Classification Search
CPC ....... G06F 12/0269; G06F 2009/45575; G06F 2009/45583; G06F 2009/45591; G06F 2209/5022
USPC ......................................................... 717/159
See application file for complete search history.

(56) References Cited

U.S. PATENT DOCUMENTS

| | | | |
|---|---|---|---|
| 9,213,562 B2 | 12/2015 | Veresov | |
| 2012/0159477 A1* | 6/2012 | Veresov | G06F 9/45504 718/1 |
| 2014/0208041 A1* | 7/2014 | Hyde | G11C 7/1006 711/146 |
| 2016/0070593 A1* | 3/2016 | Harris | G06F 9/522 718/106 |
| 2019/0391753 A1 | 12/2019 | Nilsen | |
| 2020/0125364 A1 | 4/2020 | Osterlund | |

OTHER PUBLICATIONS

"VM Operations," https://maxine-vm.readthedocs.io/en/stable/VM-Operations.html, Jan. 1, 2019, pp. 1-4.

"Garbage collection—java gc: what programming style makes safe point attainment easier (faster)?," https://stackoverflow.com/questions/31217855/java-gc-what-programming-style-makes-safe-point-attainment-easier-faster, Sep. 23, 2018, pp. 1-3.

Kuc, "A Step-by-Step Guide to Java Garbage Collection Tuning" https://sematext.com/blog/java-garbage-collection-tuning, Jan. 14, 2020, pp. 1-9.

"IBM Web Sphere Application Server Performance Cookbook—Java," https://publib.boulder.ibm.com/httpserv/cookbook/Java.html, Dec. 31, 2019, pp. 1-10.

Combined search and examination report in Application No. GB2114343.3, dated May 12, 2022, pp. 1-12.

Mell et al. "The NIST Definition of Cloud Computing", NIST Special Publication 800-145, 2011, 7 pages.

* cited by examiner

FIG. 1

(1) set the thread state to "native transition"
(2) StoreLoad Barrier // full memory fence
(3) GC safepoint
(4) set the thread state to "vm"
(5) execute native code
(6) set the thread state to "vm transition"
(7) Storeload barrier // full memory fence
(8) GC safepoint
(9) set the thread state to "native"

SELECTIVE INJECTION OF GC SAFEPOINTS FOR JNI INVOCATIONS

BACKGROUND

The present invention generally relates to computing systems, and more particularly to selective injection of Garbage Collection (GC) safepoints for Java Native Interface (JNI) invocations.

When garbage collection (GC) is necessary, mutator threads are suspended at GC safepoints and wait for a GC to finish. The Java Virtual Machine (JVM) inserts GC safepoints at appropriate locations in Java code. Before and after the invocation of a native method are GC safepoints. In OpenJDK®, the state of a mutator thread is changed before and after GC safepoints. To recognize the state correctly, a full memory fence is necessary at the safepoint. In OpenJDK®, GCs can be executed even when native methods are running. Under high GC frequency, the more GC safepoints are inserted, the faster the application runs.

However, when native methods are executed frequently, these native methods degrade due to the full memory fence at the GC safepoints. As a result, total performance of an application can be also degraded.

SUMMARY

According to aspects of the present invention, a computer-implemented method is provided for managing Garbage Collection (GC) safepoints. The method includes determining whether a GC safepoint for a target native method can be removed by checking a heap occupancy ratio prior to executing the target native method. The method further includes removing the GC safepoint responsive to the heap occupancy ratio prior to executing the target native method being less than a threshold occupancy amount percentage. The method also includes determining whether the GC safepoint for the target native method can be removed by checking a most recent GC pause time. The method additionally includes removing the GC safepoint responsive to the most recent GC pause time being shorter by a threshold pause time amount percentage than an execution time of the target native method.

According to other aspects of the present invention, a computer program product is provided for managing Garbage Collection (GC) safepoints. The computer program product includes a non-transitory computer readable storage medium having program instructions embodied therewith. The program instructions are executable by a computer to cause the computer to perform a method. The method includes determining whether a GC safepoint for a target native method can be removed by checking a heap occupancy ratio prior to executing the target native method. The method further includes removing the GC safepoint responsive to the heap occupancy ratio prior to executing the target native method being less than a threshold occupancy amount percentage. The method also includes determining whether the GC safepoint for the target native method can be removed by checking a most recent GC pause time. The method additionally includes removing the GC safepoint responsive to the most recent GC pause time being shorter by a threshold pause time amount percentage than an execution time of the target native method.

According to yet other aspects of the present invention, a computer processing system is provided for managing Garbage Collection (GC) safepoints. The computer processing system includes a memory device for storing program code. The computer processor system further includes a processor device operatively coupled to the memory device for running the program code to remove a GC safepoint responsive to any of (i) a heap occupancy ratio prior to executing a target native method being less than a threshold occupancy amount percentage and (ii) a most recent GC pause time being shorter by a threshold pause time amount percentage than an execution time of the target native method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to selective injection of Garbage Collection (GC) safepoints for Java Native Interface (JNI) invocations.

In one or more embodiments relating to applications that often run native methods, acceptable performance of the application is maintained even under high GC frequency by selectively inserting safepoints for the native methods.

In one or more embodiments, when GC frequency is low, unnecessary GC safepoints are removed for native methods. Less GC safepoints avoid full memory fences that degrade the performance of the native methods.

Figure 1:
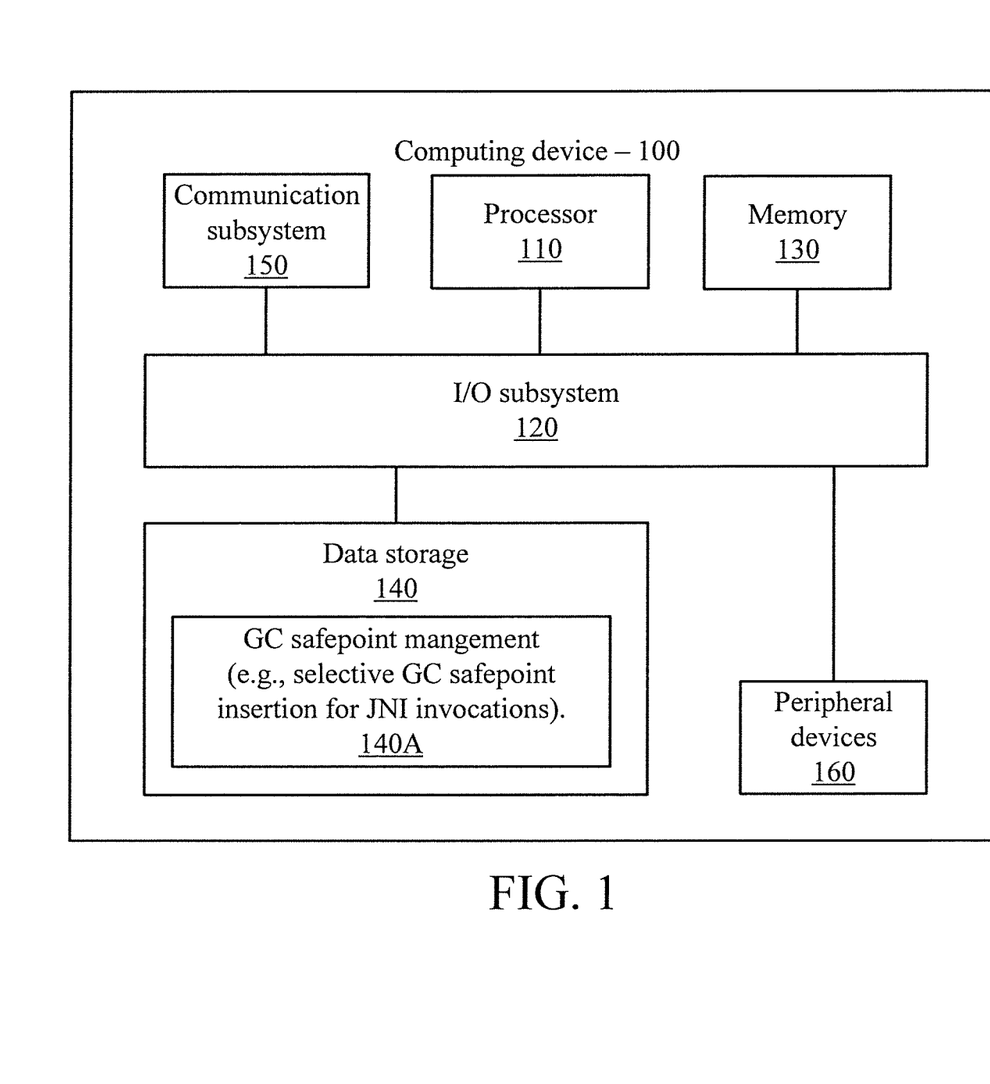
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform GC safepoint management (e.g., selective injection of GC safepoints for JNI invocations).

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for GC safepoint management (e.g., selective GC safepoint insertion for JNI invocations). The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
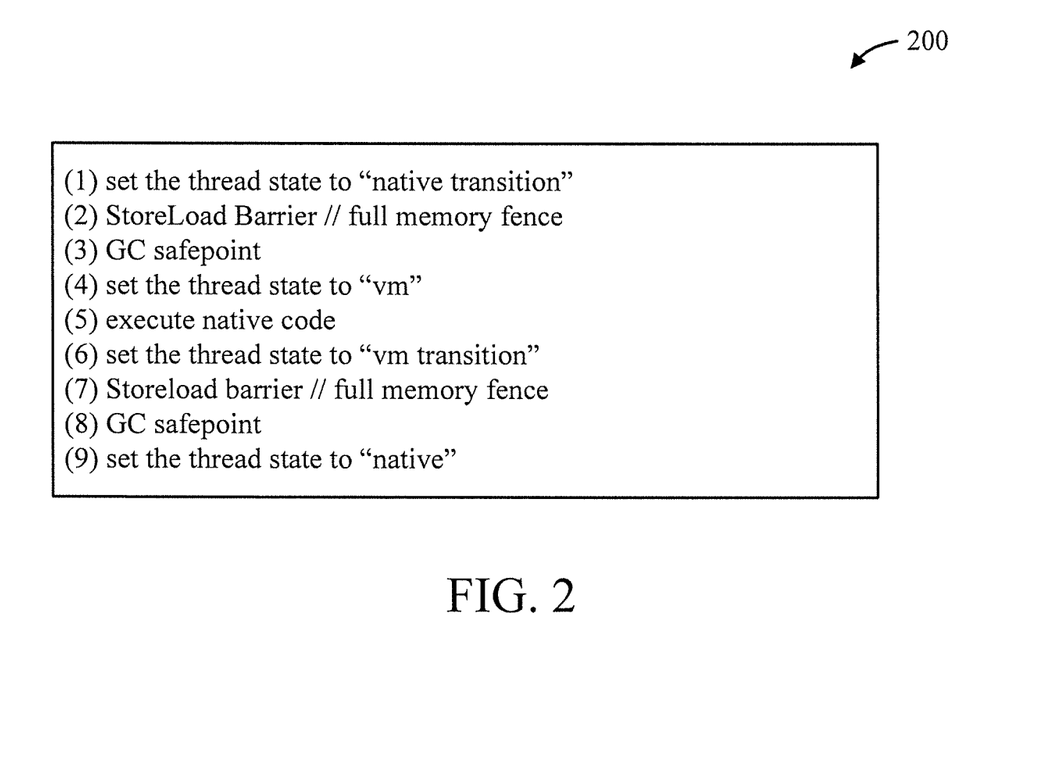
FIG. 2 shows an exemplary execution flow of a native method, in accordance with an embodiment of the present invention.

These and other variations of a hardware processor subsystem are also contemplated in accordance with embodiments of the present invention FIG. 2 shows an exemplary execution flow 200 of a native method, in accordance with an embodiment of the present invention.

It is to be appreciated that the there are two load barrier steps (2 and 7) that involve full memory fences and corresponding GC safepoints (at steps 3 and 8). The present invention can be applied to the execution flow 200 to selectively remove GC safepoints.

Figure 3:
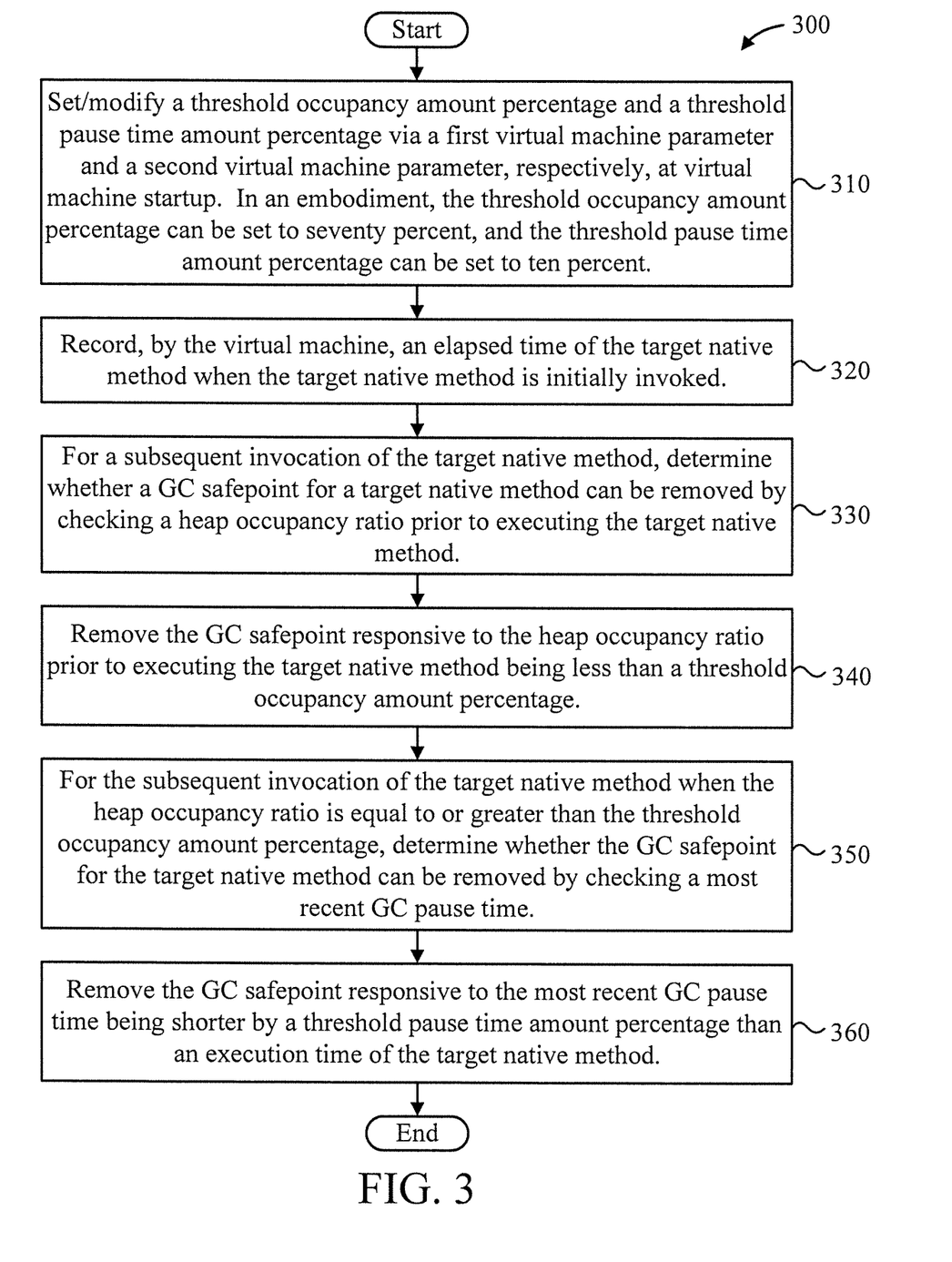
FIG. 3 is a flow diagram showing an exemplary method for GC safepoint management, in accordance with an embodiment of the present invention.

FIG. 3 is a flow diagram showing an exemplary method 300 for GC safepoint management, in accordance with an embodiment of the present invention.

At block 310, set/modify a threshold occupancy amount percentage and a threshold pause time amount percentage via a first virtual machine parameter and a second virtual machine parameter, respectively, at virtual machine startup. In an embodiment, the threshold occupancy amount percentage can be set to seventy percent, and the threshold pause time amount percentage can be set to ten percent. Of course, other percentages can be used as readily appreciated by one of ordinary skill in the art, given the teachings of the present invention provided herein.

For both parameters, a higher value can increase the opportunities for the optimization (=removing GC safepoints), but can become riskier to get drawbacks by applying the optimization. Users should find out the best-balanced values depending on their workloads, toward the higher direction. The first parameter is related to the heap occupancy rate, in which it is believed that 70% (or somewhere in 60-80% range) is a good number as a starting point for most of the workloads in practice as there is still 30% empty space in heap. Maybe 50% is not so challenging to try to achieve a gain using the optimization. In contrast, 90% is too aggressive and it is highly possible that regressions will be observed by applying the optimization too frequently. Regarding the second parameter, the default value (10%) is set much lower compared to the first parameter (70%), because the second parameter compares different nature of elapsed times. One is GC pause time, which can be often time-consuming like tens of milli seconds to hundreds of milli seconds. In contrast, the other is the execution time of a target native method, which is often fast. So, 10% seems to be a good number as a starting point to capture enough opportunities. Again, it is emphasized that other percentages can be used, while maintaining the spirit of the present invention.

At block 320, record, by the virtual machine, an elapsed time of the target native method when the target native method is initially invoked.

At block 330, for a subsequent invocation of the target native method, determine whether a GC safepoint for a target native method can be removed by checking a heap occupancy ratio prior to executing the target native method.

At block 340, remove the GC safepoint responsive to the heap occupancy ratio prior to executing the target native method being less than a threshold occupancy amount percentage. The GC safepoint is removed in this case because it is estimated that GC will not occur under these conditions.

At block 350, for the subsequent invocation of the target native method when the heap occupancy ratio is equal to or greater than the threshold occupancy amount percentage, determine whether the GC safepoint for the target native method can be removed by checking a most recent GC pause time.

At block 360, remove the GC safepoint responsive to the most recent GC pause time being shorter by a threshold pause time amount percentage than an execution time of the target native method. The GC safepoint is removed in this case because it is estimated that GC will not occur under these conditions.

Figure 4:
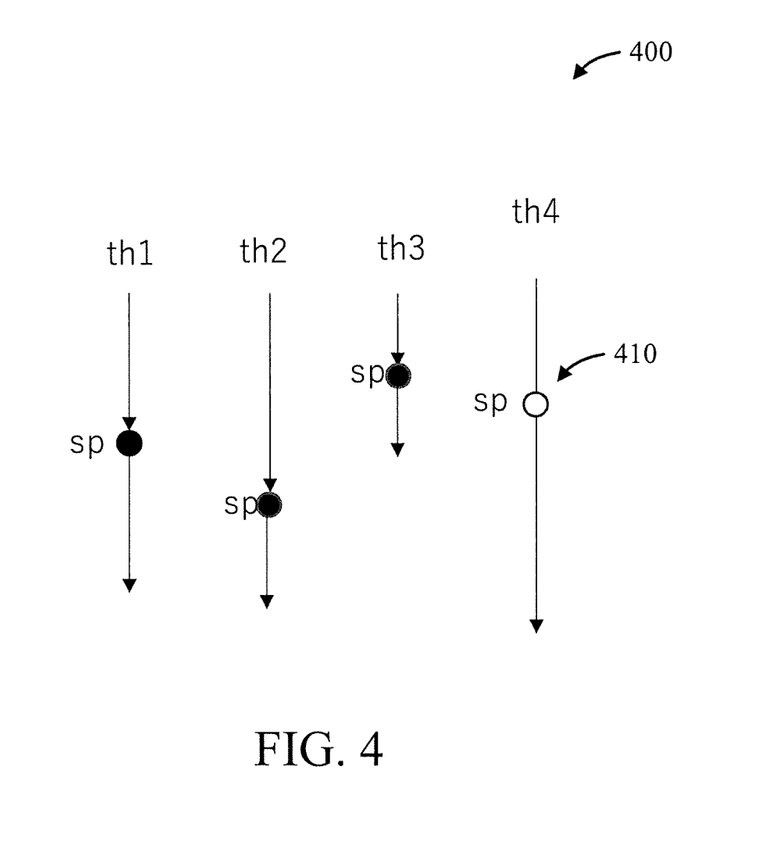
FIG. 4 is a diagram showing an exemplary scenario involving the heap occupancy ratio, in accordance with an embodiment of the present invention.

FIG. 4 is a diagram showing an exemplary scenario 400 involving the heap occupancy ratio, in accordance with an embodiment of the present invention.

The scenario 400 involves 4 threads, th1 through th4, each with a safepoint sp. Enabled safepoints are shown filled in, while disabled safepoints are hollow.

In the scenario 400, th4 is executing a native method.

Th4 disables 410 the safepoint if the heap occupancy ratio is less than the threshold.

The elapsed time of this native method is less than the threshold determined using the GC pause time.

Figure 5:
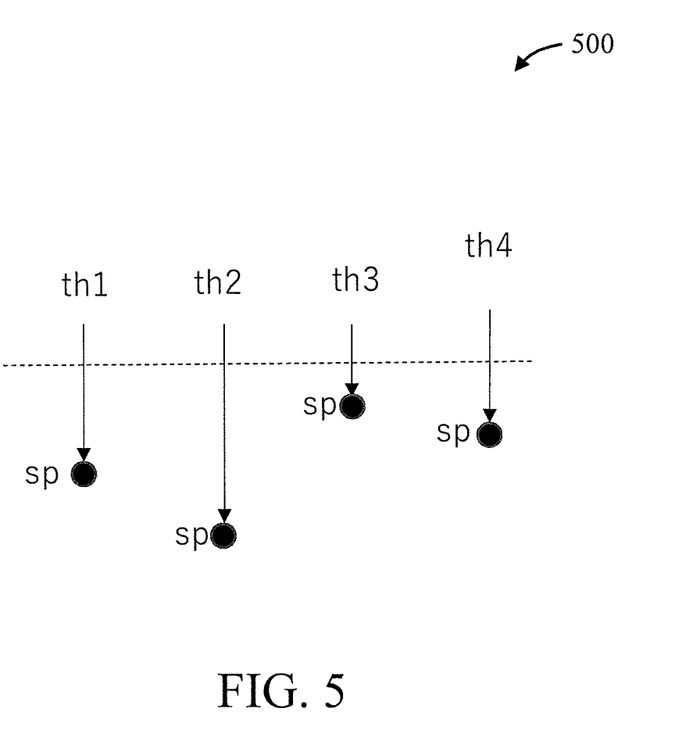
FIG. 5 is a diagram further showing exemplary scenario of FIG. 4, in accordance with an embodiment of the present invention.

FIG. 5 is a diagram further showing exemplary scenario 400 of FIG. 4, in accordance with an embodiment of the present invention.

In the scenario 400, every thread (th1 through th4) is suspended at each safepoint sp due to the request from GC. Here, GC requires stop-the-world.

In the scenario, as mentioned above, th4 is executing a native method.

Th4 keeps this safepoint available when the heap occupancy ratio reaches the threshold or the elapsed time of the native method is greater than the threshold determined using the GC pause time.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
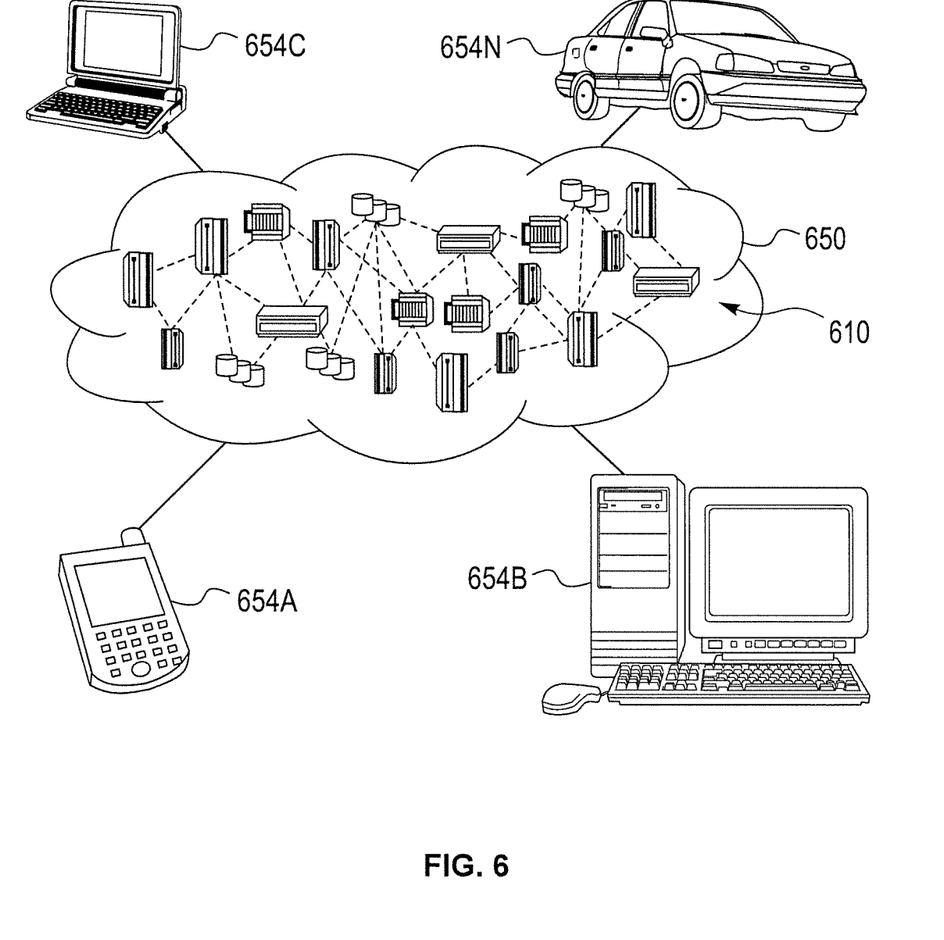
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
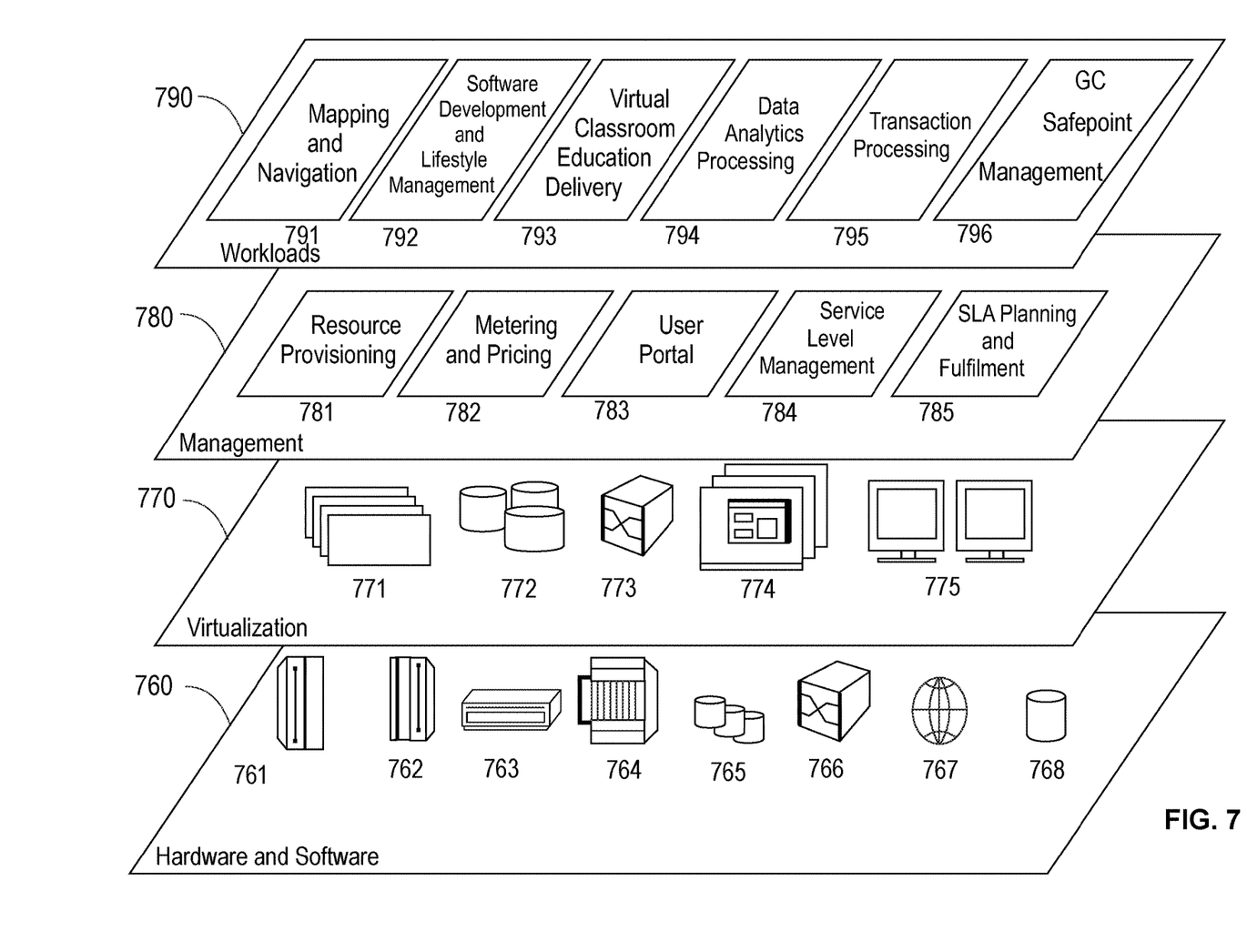
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and GC safepoint management 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for managing Garbage Collection (GC) safepoints in a Virtual Machine (VM), comprising:
removing a GC safepoint responsive to any of low GC frequency conditions based on (i) a heap occupancy ratio, determined by calculating a proportion of used memory to total available heap memory, prior to executing a target native method being less than a threshold occupancy amount percentage and (ii) a most recent GC pause time being shorter by a threshold pause time amount percentage than an execution time of the target native method; and
reducing operational interruptions and latency caused by utilizing full memory fences at the GC safepoint by performing garbage collection with the GC safepoint under high GC frequency conditions, as conditions other than low GC frequency conditions, determined to enhance performance of an application, and removing low GC frequency safepoints determined to be unnecessary to avoid utilization of the full memory fences that degrade performance of the application, the removing low GC frequency safepoints being executed by the VM automatically based on the heap occupancy ratio and the most recent GC pause time.

2. The computer-implemented method of claim 1, wherein the threshold occupancy amount percentage is modifiable via a virtual machine parameter at virtual machine startup.

3. The computer-implemented method of claim 1, wherein the threshold pause time amount percentage is modifiable via a virtual machine parameter at virtual machine startup.

4. The computer-implemented method of claim 1, further comprising setting the threshold occupancy amount and the threshold pause time amount via respective virtual machine parameters at virtual machine startup.

5. The computer-implemented method of claim 1, wherein the threshold occupancy amount is set to seventy percent.

6. The computer-implemented method of claim 1, wherein the threshold pause time amount is set to ten percent.

7. The computer-implemented method of claim 1, further comprising recording, by a virtual machine, an elapsed time of the target native method when the target native method is initially invoked, and repeating the method for later invocations of the target native method.

8. The computer-implemented method of claim 1, further comprising restricting garbage collection from being performed responsive to the heap occupancy ratio prior to executing the target native method being less than the threshold occupancy amount percentage.

9. The computer-implemented method of claim 1, further comprising determining whether the GC safepoint for the target native method can be removed by checking the most recent GC pause time responsive to the heap occupancy ratio prior to executing the target native method being any of equal to and greater than a threshold occupancy amount percentage.

10. A computer program product for managing Garbage Collection (GC) safepoints in a Virtual Machine (VM), the computer program product comprising a non-transitory computer readable storage medium having program instructions embodied therewith, the program instructions executable by a computer to cause the computer to perform a method comprising:
removing, by a hardware processor of the computer, a GC safepoint responsive to any of low GC frequency conditions based on (i) a heap occupancy ratio, determined by calculating a proportion of used memory to total available heap memory. prior to executing a target native method being less than a threshold occupancy amount percentage and (ii) a most recent GC pause time being shorter by a threshold pause time amount percentage than an execution time of the target native method; and
reducing operational interruptions and latency caused by utilizing full memory fences at the GC safepoint by performing, by the hardware processor, garbage collection with the GC safepoint under high GC frequency conditions, as conditions other than low GC frequency conditions, determined to enhance performance of an application, and removing low GC frequency safepoints determined to be unnecessary to avoid utilization of the full memory fences that degrade performance of the application, the removing low GC frequency safepoints being executed by the VM automatically based on the heap occupancy ratio and the most recent GC pause time.

11. The computer program product of claim 10, wherein the threshold occupancy amount percentage is modifiable via a virtual machine parameter at virtual machine startup.

12. The computer program product of claim 10, wherein the threshold pause time amount percentage is modifiable via a virtual machine parameter at virtual machine startup.

13. The computer program product of claim 10, wherein the method comprises setting the threshold occupancy amount and the threshold pause time amount via respective virtual machine parameters at virtual machine startup.

14. The computer program product of claim 10, wherein the threshold occupancy amount is set to seventy percent.

15. The computer program product of claim 10, wherein the threshold pause time amount is set to ten percent.

16. The computer program product of claim 10, wherein the method comprises recording, by virtual machine, an elapsed time of the target native method when the target native method is initially invoked, and repeating the method for later invocations of the target native method.

17. The computer program product of claim 10, wherein the method comprises restricting garbage collection from being performed responsive to the heap occupancy ratio prior to executing the target native method being less than the threshold occupancy amount percentage.

18. The computer program product of claim 10, further comprising determining whether the GC safepoint for the target native method can be removed by checking the most recent GC pause time responsive to the heap occupancy ratio prior to executing the target native method being any of equal to and greater than a threshold occupancy amount percentage.

19. A computer processing system for managing Garbage Collection (GC) safepoints in a Virtual Machine (VM), comprising:
   a memory device for storing program code; and
   a processor device operatively coupled to the memory device for running the program code to remove a GC safepoint responsive to any of low GC frequency conditions based on (i) a heap occupancy ratio, determined by calculating a proportion of used memory to total available heap memory, prior to executing a target native method being less than a threshold occupancy amount percentage and (ii) a most recent GC pause time being shorter by a threshold pause time amount percentage than an execution time of the target native method; and
   reducing operational interruptions and latency caused by utilizing full memory fences at the GC safepoint by performing garbage collection with the GC safepoint under high GC frequency conditions, as conditions other than low GC frequency conditions, determined to enhance performance of an application, and removing low GC frequency safepoints determined to be unnecessary to avoid utilization of the full memory fences that degrade performance of the application, the removing low GC frequency safepoints being executed by the VM automatically based on the heap occupancy ratio and the most recent GC pause time.

20. The computer processing system of claim 19, wherein any of the threshold occupancy amount percentage and the threshold pause time amount percentage are modifiable via a respective virtual machine parameter at virtual machine startup.

* * * * *